(12) United States Patent
Mahler et al.

(10) Patent No.: US 9,342,794 B2
(45) Date of Patent: May 17, 2016

(54) NON-LINEAR CLASSIFICATION OF TEXT SAMPLES

(71) Applicant: Bazaarvoice, Inc., Austin, TX (US)

(72) Inventors: Daniel Mahler, Austin, TX (US); Eric D. Scott, Austin, TX (US); Milos Curcic, Belgrade (RS); Eric Allen, Austin, TX (US)

(73) Assignee: Bazaarvoice, Inc., Austin, TX (US)

( * ) Notice: Subject to any disclaimer, the term of this patent is extended or adjusted under 35 U.S.C. 154(b) by 392 days.

(21) Appl. No.: 13/837,803

(22) Filed: Mar. 15, 2013

(65) Prior Publication Data

US 2014/0279738 A1    Sep. 18, 2014

(51) Int. Cl.
G06F 15/18    (2006.01)
G06N 99/00    (2010.01)
G06F 17/22    (2006.01)
G06N 5/02    (2006.01)
G06N 7/00    (2006.01)

(52) U.S. Cl.
CPC .......... *G06N 99/005* (2013.01); *G06F 17/2217* (2013.01); *G06N 5/025* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 5,510,981 A * | 4/1996 | Berger ................ | G06F 17/2827 704/2 |
| 6,654,744 B2 | 11/2003 | Katayama et al. | |
| 7,542,959 B2 * | 6/2009 | Barnhill ................... | G06F 19/24 706/48 |
| 7,917,522 B1 * | 3/2011 | Raffill et al. ................... | 707/754 |
| 8,095,548 B2 * | 1/2012 | Pennington .................... | 707/753 |
| 8,380,647 B2 * | 2/2013 | Perronnin ................. | G06N 7/00 706/15 |
| 8,667,389 B2 * | 3/2014 | Black ........................... | 715/235 |
| 8,843,470 B2 * | 9/2014 | Li ...................... | G06F 17/30657 707/708 |
| 2006/0041583 A1 | 2/2006 | Horvitz | |
| 2006/0069678 A1 | 3/2006 | Chou | |
| 2006/0212142 A1 * | 9/2006 | Madani et al. .................. | 700/49 |
| 2007/0192333 A1 * | 8/2007 | Ali .................................. | 707/10 |
| 2007/0239433 A1 | 10/2007 | Chaski | |
| 2008/0040298 A1 | 2/2008 | Kanungo | |
| 2008/0243487 A1 | 10/2008 | Dayan | |
| 2008/0249764 A1 | 10/2008 | Huang | |

(Continued)

OTHER PUBLICATIONS

Chapter 4 Dimension Reduction Padraig Cunningham 2008 Springer-Verlag Berlin Heidelberg.*
Dimension Reduction—2008 Padraig Cunningham.*

(Continued)

*Primary Examiner* — Kakali Chaki
*Assistant Examiner* — Ababacar Seck
(74) *Attorney, Agent, or Firm* — Meyertons, Hood, Kivlin, Kowert & Goetzel, P.C.

(57) ABSTRACT

Non-linear classifiers and dimension reduction techniques may be applied to text classification. Non-linear classifiers such as random forest, Nyström/Fisher, and others, may be used to determine criteria usable to classify text into one of a plurality of categories. Dimension reduction techniques may also be used to reduce feature space size. Machine learning techniques may be used to develop criteria (e.g., trained models) that can be used to automatically classify text. Automatic classification rates may be improved and result in fewer numbers of text samples being unclassifiable or being incorrectly classified. User-generated content may be classified, in some embodiments.

19 Claims, 9 Drawing Sheets

(56) References Cited

U.S. PATENT DOCUMENTS

2009/0281978 A1* 11/2009 Gordon et al. .................. 706/52
2010/0185568 A1   7/2010 Bates et al.
2012/0239379 A1   9/2012 Gershnik
2013/0024407 A1*  1/2013 Thompson ........ G06F 17/30707
                                                         706/12

OTHER PUBLICATIONS

Web 2.0 and User-Generated Content: legal challenges in the new frontier—2007 Dr Carlisle George Dr Jackie Scerri.*

Mikel Penagarikano, et al., "Dimensionality Reduction for Using High-Order n-grams in SVM-Based Phonotactic Language Recognition," Interspeech ISCA, 2011, pp. 853-856.

Rob Van Dam and Dan Ventura, "ADtrees for Sequential Data and N-gram Counting," IEEE International Conference on Systems, Man and Cybernetics, Oct. 7-10, 2007, pp. 492-497.

Laurence Hirsch, et al., "Evolving Rules for Document Classification," Genetic Programming, Lecture Notes in Computer Science, vol. 3447, 2005, pp. 85-95.

William B. Cavnar and John M. Trenkle, "N-Gram-Based Text Categorization," in Proceedings of SDAIR-94, 3rd Annual Symposium on Document Analysis and Information Retrieval, 1994, 14 pages.

Zhong Gu and Daniel Berleant, "Hash Table Sizes for Storing N-Grams for Text Processing," Technical Report 10-00a, Software Research Lab, Dept. of Electrical and Computer Engineering, Iowa State, Oct. 2000, 12 pages.

Erik Tromp and Mykola Pechenizkiy, "Graph-Based N-gram Language Identification on Short Texts," Department of Computer Science, Eindhoven University of Technology, 2011, 8 pages.

Mikel Penagarikano, Amparo Varona, Luis Javier Rodriguez-Fuentes, German Bordel, "Dimensionality Reduction for Using High-Order n-grams in SVM-Based Phonotactic Language Recognition," GTTS, Department of Electricity and Electronics University of the Basque Country, Spain, undated, 4 pages.

George Giannakopoulos and Vangelis Karkaletsis, "Summarization System Evaluation Revisited: N-Gram Graphs," ACM Transactions on Speech and Language Processing, vol. 5, No. 3, article 5, Oct. 2008, 39 pages.

International Search Report and Written Opinion in Application No. PCT/US2014/027314 mailed Aug. 24, 2014, 10 pages.

* cited by examiner

400

402

Text Sample: *"There was a quick brown fox that jumped over the lazy dog."*

405

First N-gram to be hashed: Ther

410

Binary representation: 01010100 01101000 01100101 01110010

T    h    e    r

| | Intermediate Hash Values | Final Hash Values |
| --- | --- | --- |
| 415 | 422, 424, 426 | 432, 434, 436 |

Hash1(SeedA, BinaryValue(Ther)) = 2     Modulo(3, 4096)    = 2
Hash1(SeedB, BinaryValue(Ther)) = 45    Modulo(45, 4096)   = 45
Hash2(SeedC, BinaryValue(Ther)) = 8192  Modulo(8192, 4096) = 0

| -1 | 0 | -1 | 0 | . . . | +1 | . . . | 0 |
|---|---|---|---|---|---|---|---|
| 0 | 1 | 2 | 3 | | 45 | | 4095 |

*FIG. 4B*

| | 0 | 1 | 2 | 3 | 4 | | 4095 |
|---|---|---|---|---|---|---|---|
| 99,999 | +1 | 0 | 0 | 0 | -1 | | +1 |
| ... | | | | | | | |
| 2 | -4 | +1 | 0 | 0 | +1 | | 0 |
| 1 | 0 | 0 | 0 | +1 | +2 | | -3 |
| 0 | +3 | 0 | -1 | -2 | +4 | . . . | 0 |

NON-LINEAR CLASSIFICATION OF TEXT SAMPLES

BACKGROUND

This disclosure relates to machine learning techniques as applied to text samples, and more particularly, to a text classification model that may be used in order to automatically classify an unknown text sample into one of a plurality of different categories.

In various contexts, it may be desirable to classify text samples into different categories. Such classification may typically be performed by human beings, who may read a text sample, evaluate its content, and then determine if there is a particular category that should be associated with the text sample. On a large scale, human text review may be costly. For example, if a human reviewer is paid $10 an hour and is capable of reviewing 100 text samples in an hour, the average cost for reviewing a single text sample would be $0.10. In a situation with thousands, hundreds of thousands, or even millions of text samples that require classification, human review may be an expensive proposition.

In contrast, automated machine classification may attempt to classify text samples without human review. In some cases, however, such techniques may suffer from inaccuracies (e.g., false positives or negatives), or an inability to definitively classify certain content. Accordingly, even if using automated classification, there may be text samples that require human review in order to be classified (and other text samples may be misclassified). Such as classification process may be inefficient, particularly when dealing with large numbers of text samples.

Text sample classification may also be used in the review of user-generated content (UGC). For example, an owner of a website that publishes UGC might or might not want certain UGC to be published, depending on various criteria. Thus, using existing text classification techniques, classifying UGC may be inefficient and/or costly.

BRIEF DESCRIPTION OF THE DRAWINGS

FIG. 4A is a diagram of one example of feature generation for a text sample.

FIG. 4B is a diagram of one embodiment of a data structure configured to store feature values for n-grams (or other features) that relate to a text sample.

FIG. 5 is a diagram of one embodiment of a data structure that relates to features for text samples in a training set.

FIG. 7A is a flow chart of one embodiment of a method relating to using a non-linear classifier to establish classification criteria for text samples, while

Figure 1:
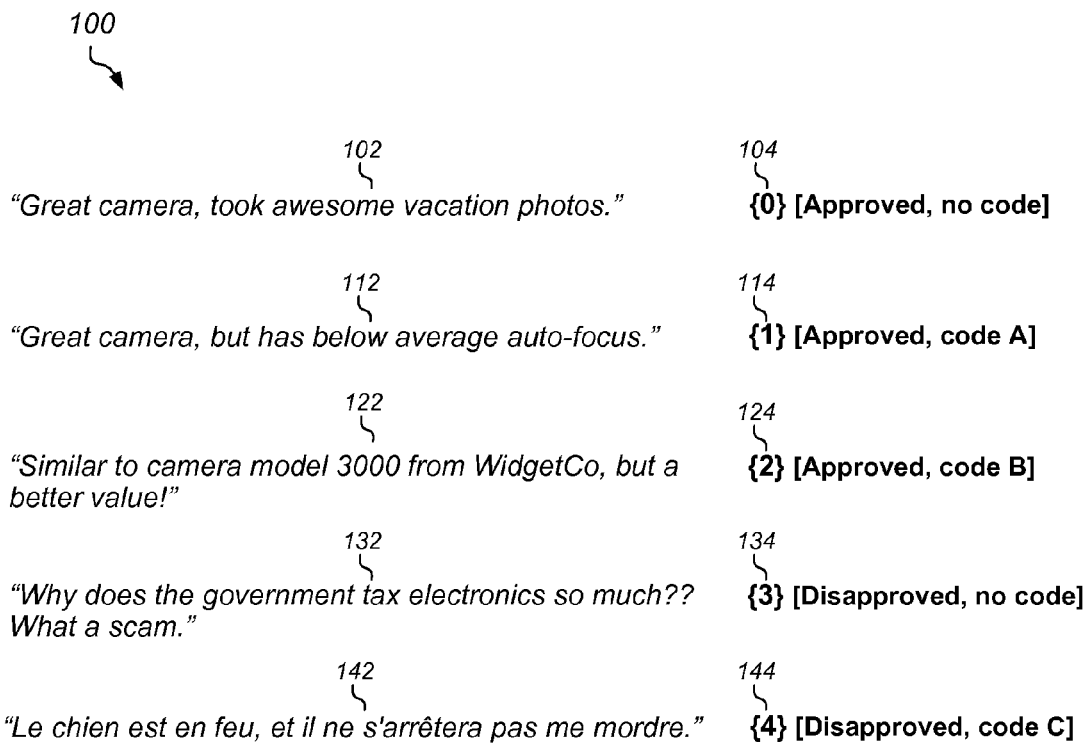
FIG. 1 is a diagram illustrating several text samples and corresponding classifications for those text samples.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed herein as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not powered on). The units/circuits/components used with the "configured to" language include hardware—for example, circuits, memory storing program instructions executable to implement the operation(s), etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

As used herein, terms such as "first," "second," etc. are used as labels for nouns that they precede, and, unless otherwise noted, do not imply any type of ordering (e.g., spatial, temporal, logical, etc.) for those nouns. For example, a "first" text sample and a "second" text sample can be used to refer to any two text samples; the first text sample is not necessarily generated prior to the second text sample.

Still further, the terms "based on" and "based upon" are used herein to describe one or more factors that affect a determination. These terms do not foreclose additional factors that may affect a determination. That is, a determination may be solely based on the factor(s) stated or may be based on one or more factors in addition to the factor(s) stated. Consider the phrase "determining A based on B." While B may be a factor that affects the determination of A, this phrase does not foreclose the determination of A from also being based on C. In other instances, however, A may be determined based solely on B.

DETAILED DESCRIPTION

"Linear classifier." As used herein, this term includes its ordinary meaning, and includes a classifier that uses a linear combination of one or more features (e.g., characteristics) of an object to classify that object. For example, in two-dimensional space, the division $y \leq x+2$ is a linear classifier (e.g., denoting that any given point on a graph having a y value that is less than or equal to the given point's corresponding x value plus two would be considered as belonging to a first class, while other points would be considered as belonging to a second class). Further discussion of linear classifiers is provided below prior to the description of FIG. 7A.

"Non-linear classifier." As used herein, this term includes its ordinary meaning, and includes a classifier that uses at least one non-linear operation on one or more features of an object to classify that object. Accordingly, a classifier that uses a combination of a non-linear transformation with a linear classifier is a non-linear classifier for purposes of this disclosure. The term "non-linear classifier" may thus be used to refer to a wide variety of classifiers known to those of skill in the art, including, but not limited to, random tree classifiers, neural network classifiers, etc. The term also encompasses a "Nyström/Fisher" non-linear classification technique described herein. Further discussion of non-linear classifiers is provided below prior to the description of FIG. 7A.

"User-generated content" (UGC). As used herein, this term refers to text, audio, video, or another information carrying medium that is generated by a user who may be a consumer of something (e.g., of goods, a product, a website, a service), a purchaser of that something, or may otherwise have an interest in that something. User-generated content includes, in various embodiments, user reviews, user stories, ratings, comments, problems, issues, questions, answers, opinions, or other types of content.

* * *

Structures and techniques are described herein that allow non-linear classifiers and dimension reduction techniques to be applied for text classification. In various embodiments, non-linear classifiers such as random forest, Nyström/Fisher, and others, may be used to determine criteria usable to classify text into one of a plurality of categories. Dimension reduction techniques may be used in order to reduce a potentially extremely large feature space to a more manageable space (for example, reducing a feature space from perhaps tens of millions of possible values to only a few thousand or tens of thousands of possible values, in some embodiments).

Thus, machine learning techniques may be used in order to develop criteria (e.g., trained models) that can be used to automatically classify text. As discussed below, merely using linear classification techniques may not be suitable for automatic text classification. Text samples may have a number of corresponding "features" (e.g., identifying characteristics), and depending on how such features are generated, there may be a large number of possible values for any given features. Using non-linear classification in such contexts may be computationally expensive in some embodiments (for example, as the number of possible values for a given feature increases).

Thus, dimension reduction techniques may be used to attempt to reduce the computational complexity of using a non-linear classifier, while still preserving important information about the features of a text sample. When features have a large number of possible values, a resulting data structure (e.g., matrix) for a number of text samples may be extremely sparse. For example, if there are tens of millions of possible feature values, but there are only 80 features generated from a text sample, then nearly all of those possible feature values will be "0" (or contain no information). Dimension reduction may thus greatly reduce a size of a data structure used to hold feature information, while also losing little information about those features, in various embodiments.

Thus, in various embodiments, classification techniques described herein may improve automatic classification rates and result in fewer numbers of text samples being unclassifiable (e.g., and needing human review) or being incorrectly classified. These classification techniques may also be used, more specifically, in the field of moderating UGC, though are not limited to this application.

* * *

Turning first to FIG. 1, a diagram 100 is shown of several text samples (102, 112, 122, 132, 142) and corresponding different ones (104, 114, 124, 134, 144) of a plurality of classifications for those text samples. In the embodiment of FIG. 1, the text samples are UGC that has been submitted by one or more users for a specific model of camera. The corresponding classifications, in some embodiments, may be produced by one or more human reviewers that have examined the text samples. Note that the techniques of this disclosure are not limited to UGC, and may be applied in various embodiments to any context in which text samples are used.

Note that as used herein, the term "text" should be given its ordinary meaning, which includes at least a representation of written language that is made up of characters. Text characters as contemplated in this disclosure may include characters from any suitable digital character set, including, but not limited to, alphanumeric characters, symbols, the Arabic alphabet, the Cyrillic alphabet, the Hebrew alphabet, the Japanese alphabet, the Korean alphabet, the Greek alphabet, Kanji characters, etc. As used herein, a "text sample" refers to a discrete collection of text characters. A text sample may correspond, for example, to text within a single electronic file or message, a portion thereof, etc. In some embodiments described herein, an individual text sample may correspond to an item of user-generated content (UGC)—for example, a specific user review or rating of a product or service. One of ordinary skill in the art would understand, for example, that text or a text sample is distinct from an image.

As discussed above, in some embodiments, individual ones of a plurality of classifications may or may not have associated codes. In the embodiment of FIG. 1, for example, three of the five classifications shown (114, 124, and 144) have associated codes, the meaning of which will be discussed below. In some embodiments, however, it may be the case that one or more of a plurality of classifications do not have any associated codes. Accordingly, in one embodiment, there may be only two classifications: (I) "approved" [no code]; and (II) "disapproved" [no code]. In another embodiment, however, there are three classifications: (I) "approved" [no code]; (II) "disapproved" [no code]; and (III) "needs human review" [no code]. Numerous other classification schemes are possible.

As shown in the embodiment of FIG. 1, text sample 102 has been determined by at least one human reviewer to belong to category 0. In this embodiment, category 0 means that the text sample is approved (e.g., for dissemination, such as showing text sample 102 to potential shoppers on a website), though category 0 does not have any corresponding code that indicates an additional meaning. Text sample 112 is associated with category 1. In this embodiment, category 1 means that text sample 112 is approved (e.g., for dissemination), but also has an associated code A. The chart below indicates the meanings of the codes in the embodiment of FIG. 1:

Code A: Criticizes a product feature.
Code B: Discusses a competing product.
Code C: Use of foreign language.

Thus, text sample 112 was approved although it criticized the auto-focus feature of the camera being reviewed. Text sample 122 was approved, though it mentioned another product made by a competitor. Text sample 132 was disapproved (for being off-topic or irrelevant, though it has no associated code). Text sample 142 was disapproved for being in French, which may be a non-native language for a website from which text sample 142 was collected. Note that in some embodiments, training sets may be language specific, and thus if a comment is detected to be (primarily) in one language, it may be handled appropriately, as discussed below.

Language is not necessarily a limiting factor as to whether a text sample is approved, disapproved, or is otherwise placed in a particular category by a human reviewer. For example, in some embodiments, human reviewers fluent in different languages may be used, and sets of different text samples may be grouped according to language, and may thus be used to train different text classifiers for different languages. Thus, in some embodiments, a first classifier will be used if a text sample is determined to be (at least predominantly) in French, while second and third classifiers may be used if a text sample is respectively determined to be in Japanese or English. Accordingly, in some embodiments, a text sample may not be disapproved merely for being in a particular language. Also note that categories A, B, and C as discussed relative to the embodiment of FIG. 1 are only one non-limiting example, and numerous other classification schemes are possible. (Note also, however, that some embodiments that use n-grams may be language agnostic, as discussed below.)

Figure 2:
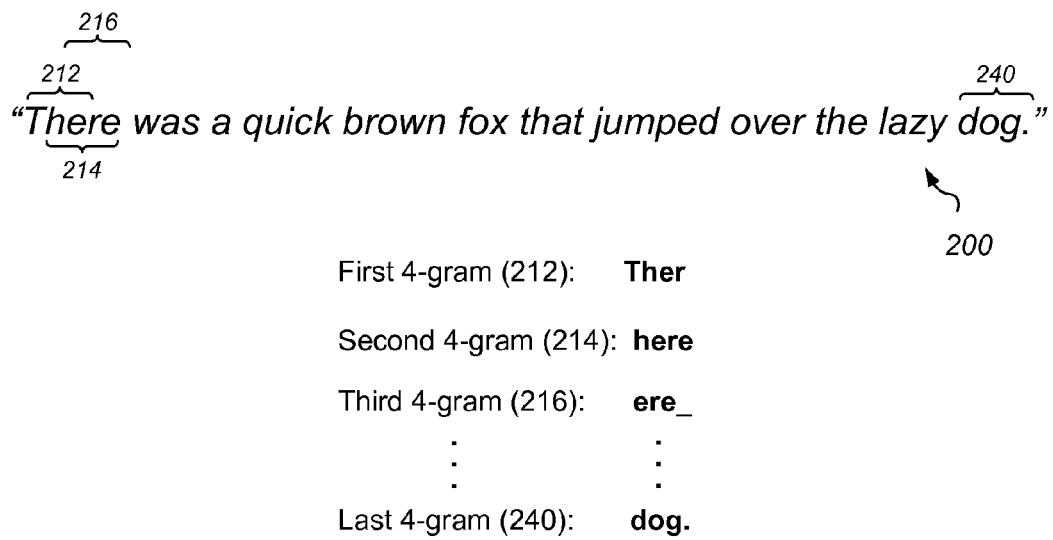
FIG. 2 is a diagram of a particular text sample and several illustrative n-grams (which may be features for that text sample).

Turning now to FIG. 2, a diagram is shown of a text sample 200, which includes several illustrative text features for a text sample, namely, character n-grams 212, 214, 216, and 240. As used herein, the term "n-gram" may refer, in various embodiments, to a string (or sub-string) of characters having a length of N characters, where N is an integer greater than or equal to 1. Accordingly, the term "n-gram," unless otherwise indicated, is being used in the examples described herein to refer specifically to character n-grams (and not, e.g., word n-grams). Word n-grams may nevertheless be used in some embodiments.

The n-grams shown in FIG. 2 relate, in various embodiments, to feature generation for text samples Generally speaking, a "feature" generated from a text sample corresponds to one or more characteristics of that text sample. In some embodiments, n-grams are used as features, while in other embodiments, entire words, phrases, or sentences may be used as features. Accordingly, the term "generating features" refers to extracting, creating, copying, etc., data that is based on one or more characteristics of a text sample. Note that features may have corresponding values, which may also be generated (e.g., using various operations, including but not limited to concatenation, multiplication, hashing and/or other dimension reduction operations, etc.). In some embodiments, a resulting numeric values calculated from a feature may be referred to as a "feature value," for example.

In the embodiment of FIG. 2, several 4-grams are shown. The first depicted 4-gram (212) for text sample 200 consists of the four characters "Ther", while the second depicted 4-gram (214) consists of the characters "here". The third depicted 4-gram (216) appearing in text sample 200 consists of the characters "ere_" (with the underscore denoting a space character). Thus, in various embodiments, n-grams for a text sample may be generated according to a "sliding window" of fixed length (e.g., four characters). As discussed below, n-grams taken from a given text sample may be features for that text sample and/or be used to generate feature values for that text sample.

Figure 3A:
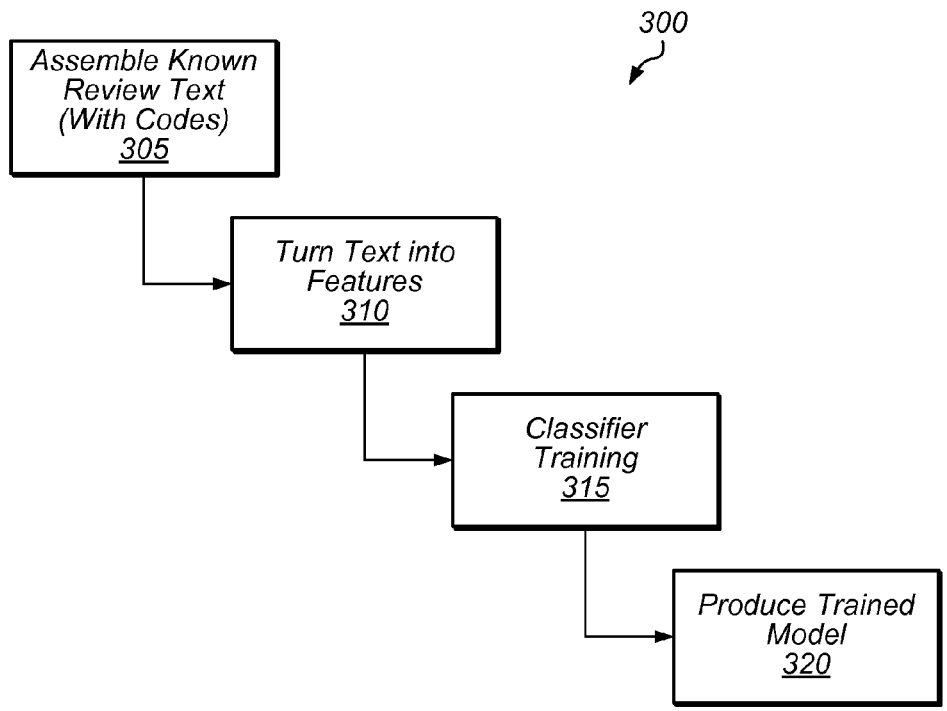
FIG. 3A is a flow chart of one embodiment of a method that relates to producing classification criteria for text samples.
Figure 3B:
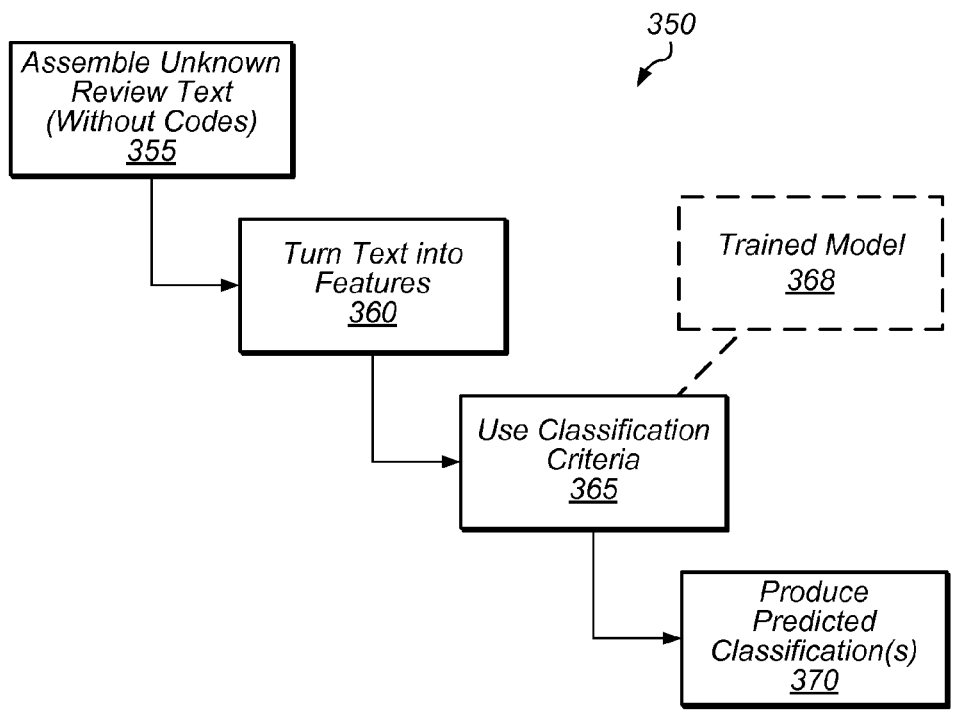
FIG. 3B is a flow chart of one embodiment of a method that relates to producing one or more predicted codes (e.g., categories) for one or more samples of unknown text.

Accordingly, text samples may be classified into one or more categories (e.g., approved, not approved, etc.). Text samples may also have various corresponding features, including n-grams in some embodiments. Text feature generation and text classification are further discussed in various embodiments below. FIGS. 3A and 3B (discussed next) provide an overview that relates to portions of this disclosure. Additional details for some features may therefore be found beginning at FIG. 4.

Turning now to FIG. 3A, a flow chart is shown of a method 300 that relates to producing classification criteria for text samples (e.g., review text). Note that all or a portion of method 300 (and method 350, described below relative to FIG. 3B) may be executed, in various embodiments, by a computer system such as system 900. One or more aspects or features of methods 300 and 350 may also combined or otherwise used with other methods and features of this disclosure (e.g., methods 700 and 750, and computer-readable storage medium 800).

In step 305 of FIG. 3A, samples of known review text are assembled. In various embodiments, text samples may have one or more codes that indicate one or more corresponding categories to which that text sample belongs (such as "approved," "disapproved," etc.). In step 310, text from known text samples are used to generate features (e.g., character n-grams), which may in turn be used to generate corresponding feature values (e.g., by performing a mathematical operation such as hashing). In step 315, classifier training is performed using the features for the known text samples. Classifier training may include feeding features to a classifier, which in some embodiments may be a non-linear classifier. In step 320, a trained model is produced, which includes classification criteria. These classification criteria may directly correspond to the trained classifier resulting from step 315, in various embodiments (i.e., the trained model may include the classification criteria). The trained model produced in step 320 may therefore be used to determine a classification for an unknown text sample.

Turning now to FIG. 3B, a flow chart is shown of a method 350 that relates to producing one or more predicted codes (e.g., categories) for one or more samples of unknown review text. Method 350 may also make use of a trained model that is produced as a result of method 300.

In step 355, unknown review text is assembled (e.g., received at a computer system from one or more data sources). The unknown review text does not yet have a corresponding code at this point (i.e., it has not been classified). In step 360, features and corresponding feature values for the unknown review text may be generated (e.g., by performing a mathematical operation such as hashing on one or more character n-grams, and thus, step 360 may use the same or similar operations to step 310 in various embodiments). In step 365, classification criteria from a trained model 368 (which may be produced in step 320) are used to determine one or more (predicted) classifications for the unknown review text. In step 370, one or more predicted classifications are produced (which may be associated with corresponding review codes).

Turning now to FIG. 4A, a diagram 400 is shown of one example of feature generation for a text sample 402. In the embodiment of FIG. 4A, one or more hash functions (dimension reduction operations) may be used in order to generate one or more corresponding feature values. The 4-gram "Ther" (405), which is the first 4-gram of text sample 402, is being used as an illustrative example, although feature generation for a text sample (or portion thereof) is not limited to the use of 4-grams (or even n-grams generally).

Feature generation is performed, in some embodiments, on a numeric (binary) representation of text characters. As shown in the embodiment of FIG. 4A, numeric representation 410 is a 32-bit value that is a concatenation of ASCII character text values for the respective characters 'T', 'h', 'e', and 'r'. Note that while ASCII character values are being used for illustrative purposes, many other possible character values may be used. Thus, in some embodiments, Unicode values may be used as character values. In other embodiments, a custom-defined set of values may be used, or other known character values may be used. Furthermore, in some embodiments, numeric representation 410 is not a concatenation of character values, but may be created using other operations (e.g., multiplying character values with each other, addition, subtraction, division, merging, etc.).

Depending on the size of an n-gram (or other portion of text), and the number of possible values for each character in the n-gram, a very large number of values for numeric representation 410 may be possible. As just one example, if each character in a 4-gram was composed only from uppercase and lowercase English alphabet characters (A-Z and a-z), and numbers 0-9, each character in that n-gram would have a total of 62 possible values. Accordingly, such a 4-gram might have a total of $62^4$ possible unique numeric representation values, or 14,776,336 total values. Accordingly, in some embodiments, the number of numeric representation values for a given n-gram may be quite large. (Again, note that in some embodiments, feature values for a text sample may be based on operations other than n-grams.)

Accordingly, one or more hashing functions 415 and/or other dimension reduction operations may be applied to an n-gram (such as 4-gram 405) in order to generate feature values for that n-gram. A single feature value may be generated for an n-gram (or other feature) in some embodiments, while in other embodiments, multiple feature values may be generated for an n-gram. In the embodiment of FIG. 4A, three feature values are being generated for the 4-gram 'Ther'.

A first hash function "Hash1" is applied to 4-gram 405 to produce an intermediate hash value of 2 (as indicated by item number 422). In this embodiment, hash function Hash1 takes a seed value (SeedA) as well as a numeric (e.g., binary) representation of the 4-gram 'Ther'. In various embodiments, hash functions (or other dimension reduction operations) may take one or more additional seed values, or may take no seed values at all. (Seed values may also be randomly generated in some embodiments.)

In the embodiment shown, intermediate hash value 45 (indicated by item number 424) is produced from the same hash function "Hash1", but using a different SeedB. Accordingly, in various embodiments, features may be generated using a same hash function, but using one or more different seeds. Intermediate hash value 8192 (indicated by item number 426) is produced using a different hash function "Hash2", as well as a different seed value (SeedC).

Final hash values (item numbers 432, 434, and 436) are then generated by applying a modulo division operation. As shown, each of the values corresponding to item numbers 432, 434, and 436 are generated by respectively taking the intermediate hash values (item numbers 422, 424, and 426) and dividing those values using 4096 as a base value for a modulo (division) operation. Accordingly, final hash values corresponding to item numbers 432, 434, and 436 have a possible range of 0 to 4095 in the embodiment shown. Note that the choice of 4096 as a modulo base value is only exemplary, and other modulo base values may be used in various embodiments. (It is also not required that modulo base values be a power of 2.)

Furthermore, although the intermediate hash values corresponding to item numbers 422, 424, and 426 are depicted as being separate from the final hash values corresponding to item numbers 432, 434, and 436 in the embodiment of FIG. 4A, in other embodiments, a hashing operation (or other dimension reduction operation) such as the "Hash1" function may produce a range of outputs that does not require further reduction from a modulo operation. For example, in other embodiments, the function "Hash1" may itself include a modulo operation before producing an output value. In such embodiments, it may be unnecessary to perform a separate and/or additional modulo operation. In other words, in various embodiments, it may in some cases be preferable to perform an additional modulo operation on an output of a hash function (e.g., depending on the range of outputs produced by a hash function (or other dimension reduction operation) and/or the size (e.g., width) of a data structure (e.g., container) that is used to store feature values for a text sample). Also note that in some embodiments, generation of feature values may include other operations that are not necessarily dimension reduction operations (e.g., non-dimension reducing transforms, etc.)

Turning now to FIG. 4B, a diagram is shown of one embodiment of a data structure 450 that is configured to store feature values for n-grams such as 4-gram 405. Accordingly, data structure 450 has 4096 total columns, as a base value of 4096 was previously applied in the embodiment of FIG. 4A to reduce the intermediate hash values corresponding to item numbers 422, 424, and 426 to suitably smaller final values. In other embodiments, data structure 450 may include some other number of columns and/or containers (e.g., not 4096). Data structure 450 may be stored in one or more computer-readable storage mediums in various embodiments. Additionally, data structure 450 may be part of (or be used to create) a portion of a larger data structure, such as data structure 500 (which discussed below with respect to FIG. 5). Each column in data structure 450 may include one container, or may include multiple containers, in various embodiments (e.g., if using different features or different types of features).

In the embodiment of FIG. 4B, data structure 450 has one single row and 4096 potential container spaces (columns) configured to store feature values for text sample 402. In this embodiment, data structure 450 is initialized to be all zeros. As shown, three containers in data structure 450 have been modified, however, to reflect the three feature values that were generated for the first 4-gram 405 ('Ther') in FIG. 4A. Accordingly, a data container in column 2 of data structure 450 has been modified because final hash value 432 is a "2". Likewise, data containers in columns 45 and 0 of data structure 450 have been modified because of the respective values of "45" and "0" for final hash values corresponding to item numbers 434 and 436.

The feature values placed into (e.g., modified for) a container may vary in different embodiments. Accordingly, during feature value generation, the modification of values for data containers (e.g., such as those in data structure 450) may be performed in a number of different ways. For example, data containers may be incremented or decremented by one based on a particular bit from an intermediate hash value (e.g., item numbers 422, 424, 426). The particular bit that is selected from an intermediate hash value in order to determine whether to increment or decrement a container may be based on various selection criteria in different embodiments (e.g., always pick the 10th bit, pick the first bit that is to the left of (more significant than) the base value that is used for a (subsequent) modulo operation, etc.) Accordingly, in some embodiments, an intermediate hash value (or other value) may affect the value in a data container of a data structure, while a final value that is the result of a modulo operation may determine which particular data container will be modified for a given feature.

Note that as additional n-grams from text sample 402 are processed, additional data containers in data structure 450 may be modified (e.g., incremented or decremented), and thus, data structure 450 as shown does not necessarily represent a set of final feature values for text sample 402. Furthermore, also note that in other embodiments, data containers in a data structure such as 450 may be modified during feature generation in other manners besides simply incrementing or decrementing by one, as will be understood by those with skill in the art.

Note that in some embodiments, dimension reduction operations may include executing one or more hash functions (e.g., as described above). In other embodiments, however, a dimension reduction operation may include matrix decompositions (e.g., Singular Value Decomposition, Independent Component Analysis, Non-Negative Matrix Factorization, Sparse Coding, and/or Sparse, Robust, Randomized or Kernelized variations of one or more of the above techniques, as may be applicable). In other embodiments, Manifold Learning may be used for dimension reduction (e.g., Isomap, Locally Linear Embeddings, Multi-Dimensional Scaling). Dimension reduction operations may be based on Clustering (in embodiments, for example, in which a specific algorithm gives a way to give degrees of membership or distance from multiple clusters, or even if a single item can belong to multiple classes simultaneously), and thus may be based on Mixture Modeling, K-means, Spectral Clustering, Consensus Clustering, and/or Sparse, Robust, Randomized, Regularized or Kernelized variations of one or more of the above methods, as may be applicable.

Turning now to FIG. 5, a diagram of one embodiment of a data structure 500 is shown. In this embodiment, data structure 500 is a matrix corresponding to 100,000 text samples, each of which has 4096 different possible final feature values. Accordingly, in the embodiment of FIG. 5, each row from 0 to 99,999 corresponds to features that have been generated from a particular one of a plurality of text samples. In one embodiment, each row of data structure 500 includes one or more feature values corresponding to one or more n-grams for the text sample for that row. (For example, a text sample for row 0 may have 63 characters, and therefore include 60 different 4-grams. If three feature values are generated for each 4-gram, there would be a total of 180 feature values (60*3) for the text sample for row 0. These 180 feature values would therefore be reflected in the values that are stored in data containers corresponding to the different columns of row 0 of data structure 500. And accordingly, a finalized version of data structure 450 from FIG. 4B may be included as one row of data structure 500, in one embodiment.)

In some embodiments, a data structure (e.g., 500) may use multiple characteristics of a text sample to generate multiple features. For example, in one embodiment, 1-grams, 2-grams, 3-grams, and 4-grams for a same text sample are used in order to generate features and feature values (e.g., for a row of data structure 500). In such an embodiment, generating a feature value for a particular 4-gram might therefore cause a data container that has already been modified based on a feature value for a particular 2-gram to be modified again (or vice versa). In other embodiments, however, different types of n-grams (or other different types of features) may only modify data containers for the same type of feature. Accordingly, in some embodiments, values in one or more rows of data structure 500 may be reflective of n-grams of different length for a particular text sample.

Figure 6:
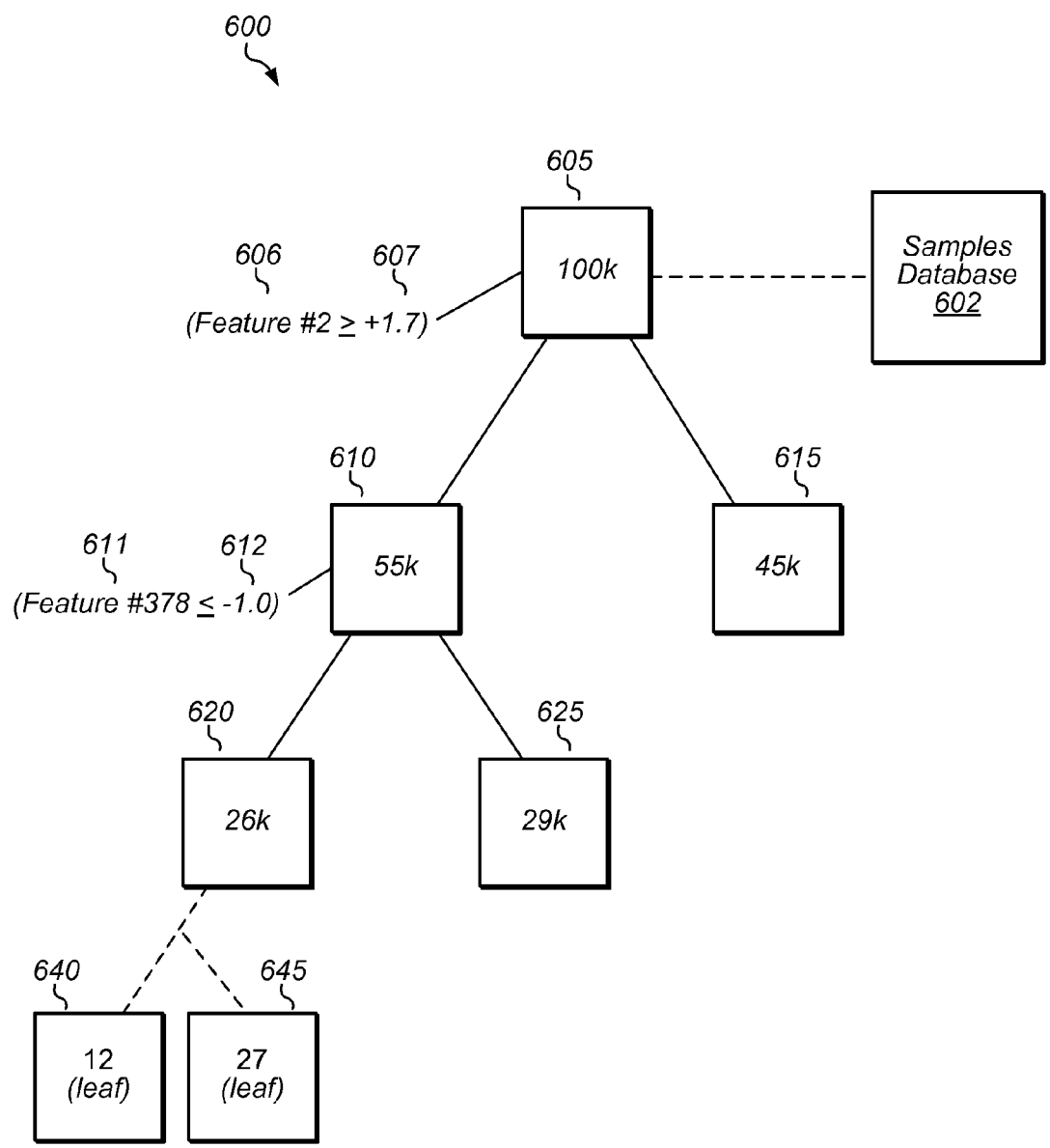
FIG. 6 is a diagram of one embodiment of a tree that is usable as one of a plurality of trees for a random forest classifier.

Turning now to FIG. 6, a diagram is shown of one embodiment of a tree 600 that is usable as one of a plurality of trees for a random forest classifier. As shown, tree 600 includes a root node 605. In the embodiment of FIG. 6, tree 600 (and correspondingly, root node 605) is associated with 100,000 known text samples that have been categorized as belonging to one of two categories (e.g., "approved" and "disapproved"). Note that for known text samples, associated information (such as what category a text sample belongs to, or what associated code that text sample has) may be stored along with the data in structure 500 (e.g., such data may be maintained in portions of data structure 500 that are not shown, or in another associated data structure, in various embodiments).

In one embodiment, the 100,000 known samples associated with tree 600 are "bootstrapped" from a database 602 (or other repository) of text samples. The size of the bootstrapped samples may be smaller than, the same size as, or larger than the text sample database (e.g., training set) in various embodiments. In some embodiments, bootstrapped samples may also be chosen with or without replacement from a sample database.

In the embodiment of FIG. 6, the 100,000 bootstrapped samples associated with tree 600 (and root node 605) are chosen, with replacement, from corresponding database 602, which has 100,000 known samples. Accordingly, in this embodiment, of the 100,000 known text samples in database 602, some may be chosen once for tree 600, some may be chosen zero times, and others may be chosen multiple times (i.e., with replacement). In some embodiments, the samples in database 602 have been preselected for a particular balance (e.g., a weighting or approximate weighting for each one of a plurality of categories). In one embodiment, database 602 is equally balanced and includes 50,000 "approved" text samples and 50,000 "disapproved" text samples. In another embodiment, database 602 includes 33,333 samples for a first category, 33,334 samples for a second category, and 33,333 samples for a third category. Other weightings, some of which may be non-equal, are possible.

In order to generate the next level of tree 600 from node 605, node 605 is split according to one or more operations that will divide the 100,000 bootstrapped text samples. In the embodiment of FIG. 6, a random subset of feature values corresponding to the 100,000 bootstrapped samples may be chosen in order to split node 605. For example, one or more different columns may be selected from a possible 4096 columns (e.g., in data structure 500). Calculations may be then performed on the selected columns to determine what feature selection would provide a good split for node 605. An ideal split may be one in which each text sample has been correctly categorized as a result of the split (although with 100,000 bootstrapped text samples, it may take numerous splits before this is possible). Also note that while tree 600 is discussed in terms of "splits" for two different categories, trees that are used for three or more categories also may be used in various embodiments (and thus "splits" may, in some embodiments, include three or more resulting paths).

Node 605 may thus be split based on a feature 606 and value 607 for that feature. Value 607 may be chosen on at least a partially random basis, in various embodiments. In determining how to split root node 605, a number of different splits may be attempted, from which the "best" split may be chosen. For example, consider three candidate splits that operate on feature #2, feature #343, and feature #975. If a candidate split on feature #2 results in 70% of the samples on one side of the split accurately have been classified as belonging to the "approved" category, while other splits on other features (e.g., #343 and #975) are less accurate (e.g., 60%), the feature #2 split may be chosen as "best" by an algorithm that is used to build tree 600. (Accordingly, in various embodiments, the closer a candidate split is to producing an even division between categories on each path of the candidate split, the worse that split may be in helping to determine whether a future unknown sample belongs to a particular category.) In other embodiments, a candidate split may be evaluated based on possible results obtained father downstream (e.g., results obtained from looking ahead one, two, three, or more levels farther downstream may be considered). Various other techniques may also be used to determine a particular split in other embodiments, as those with skill in the art will appreciate.

In the embodiment of FIG. 6, a split for node 605 has been chosen on the basis of feature #2 (indicated by item number 606) having a value greater than or equal to 1.7 (indicated by item number 607). This results in 55,000 of the text samples being associated with node 610, while the remaining 45,000 text samples are associated with node 615. At node 610, a further split is performed, with a basis of feature #(indicated by item number 611) having a value less than or equal to negative 1.0 (indicated by item number 612). This further split results in node 620 having 26,000 bootstrapped text samples associated with it, while 29,000 bootstrapped text samples are associated with node 625.

The splitting process used to build tree 600 may continue until it is halted, which may occur when child nodes each consist solely of text samples that belong to one respective classification, each exceed some threshold ratio of classification agreement, or some other criteria, in various embodiments. In the embodiment of FIG. 6, leaf nodes 640 and 645 are respectively associated with 12 "approved" and 27 "disapproved" text samples (that is, all text samples for node 640 belong to one category while all text samples for node 645 belong to another category). One or more other parent nodes (not shown) exist between node 620 and leaf nodes 640 and 645. Likewise, non-leaf nodes 620, 625, and 615 have other children that are not shown in FIG. 6. In some embodiments, splitting may also be halted on other criteria (e.g., there may be no candidate split that results in a "pure" division).

Thus, in various embodiments, once tree 600 is complete, it may be used as one of a number of trees that make up a random forest classifier. The various processes used to build tree 600 (making splits based at least partially on random data, bootstrapping in some cases, etc.) may be repeated to build a number of additional trees. In some embodiments, a random forest classifier includes 100 or more trees, while in one embodiment a random forest classifier includes 500 trees. In various embodiments, each tree then receives one or more "votes" as to which one of a plurality of categories an unknown text sample belongs to. That is, each tree may classify an unknown sample into one of a plurality of categories. If a majority, plurality, super-majority, or some other threshold of the trees arrives at a common conclusion, then the unknown text sample may be automatically classified into the corresponding category. In some embodiments, if the trees do not agree (e.g., a threshold is not reached), the unknown text sample may not be categorized, and may be flagged for human review or other additional processing.

The following paragraphs provide additional description regarding linear and non-linear classifiers. Note that numerous types of classifiers are known, including Boosting (e.g., AdaBoost, Gradient Boost, IVoting), and Neural Nets (e.g., Multi-Layer Perceptron, Kanerva sparse distributed memory, Hebbian nets, etc.). Alternative Linear Classifiers (e.g., for use with the Nyström method) include Logistic regression (e.g., Lasso, Ridge regression, Elastic net,), Winnow, Pegasos, Stochastic Gradient Descent, Perceptron, Voted Perceptron, etc. Classifiers used in some embodiments may also include Nearest Neighbor Classifiers, or ensemble methods such as Extremely Randomized Trees, Oblique Forests, etc. Techniques that may be used in accordance with text sample classification as described herein are not limited to examples discussed above or below, however.

Linear Classifiers

Linear classifiers try to classify data by finding a linear function of features that separate classes. Each data item thus may be described by a set of values $X_i$ where i identifies the features. A linear function may be a function of the form $\Sigma_i a_i x_i + c$ where the $a_i$ and c are constant coefficients that determine the function. Data may be classified by a linear function by taking the sign of the value of the function applied to the data item. Linear classifiers have various desirable properties for machine learning techniques. Many algorithms including perceptrons, Support Vector Machines (SVMs) & Fisher linear discriminants also have well-developed mathematical theory & may be implemented efficiently.

Linear Separability

Not all classification problems can be solved with linear classifiers, however. A very simple counter example is the XOR problem:

| x1 | x2 | y |
|----|----|----|
| 0  | 0  | 0 |
| 0  | 1  | 1 |
| 1  | 0  | 1 |
| 1  | 1  | 0 |

In this problem, there is no a1, a2 & c such that y=1 whenever (a1)(x1)+(a2)(x2)+c>0 and y=0 otherwise. Problems that can be solved using linear classifiers may be described as linearly separable.

Non-Linear Transformations

Linearly inseparable problems can be transformed into linearly separable ones to get the benefits of linear classifiers. This may involve adding features that are nonlinear functions of the original features. For example the XOR problem can be made linearly separable by the transformation: (x1, x2)→(x1, x2, x1x2), i.e. by adding as a third feature the product of the original two features. The XOR problem can thus be separated by the function x1+x2−2(x3)−1.

It may be a problem to find a linear function that will make a given problem linearly separable. For complex problems where the form of transformation is not known in advance, one approach is to just add all features of a certain form, like all pairwise products $x_i x_j$, allowing a classifier to learn all quadratic functions of the original features. However, systematically adding all nonlinear functions of some form as features may lead to a combinatorial explosion in the number of new features, making computation in terms of the new features computationally unfeasible.

Kernels & The Kernel Trick

The kernel trick is a mechanism for dealing with the combinatorial explosion of features described above. Many algorithms only use the feature values to compute the dot products between feature vectors of data items. In cases where the feature set is massively expanded, it is sometimes possible to efficiently compute the dot product of the transformed feature vectors without explicitly computing all the new features. For example, if the new features are taken as all the pairwise products of the original features $x_i x_j$, the dot product of the expanded feature vectors $X \cdot Y$ is $\Sigma_{i,j} x_i x_j y_i y_j$, which has quadratic complexity in the number of original features. However, $X \cdot Y = \Sigma_{i,j} x_i x_j y_i y_j = (\Sigma_i x_i y_i)(\Sigma_j x_j y_j) = (x \cdot y)^2$, so it can be computed as the square of the dot product of the original feature vectors with linear complexity in the number of original features. Computing the dot product of the transformed features directly from the original features without computing the transformed features explicitly is known as the kernel trick. Given a transformation T, for example, the function K(x, y)=T(x)·T(y) that computes the dot product of the transformed kernel directly from the original vectors is called the kernel. It turns out that any real valued function of 2 vectors that is positive definite can be thought of as a kernel for some transformation (e.g., possibly into an infinite dimensional space). Methods that only use the dot products of feature vectors and make no other use of the feature values may be called dual space methods.

Kernels, Margins, Regularization & Support Vector Machines

Expansion of in the number of features (particularly on the scale caused by commonly used kernels) may achieve expressivity at the expense of risking overfitting and other problems related to dimensionality. Kernels may be used with learning algorithms, however, that provide ways to control problems such as overfitting. Techniques for controlling such problems include margins & regularization, which are central to various embodiments of SVM algorithms. However the complexity of training dual space SVMs is quadratic in the number of training samples, which may render it unsuitable for big data applications. SVMs used with the linear kernel (i.e., the standard Euclidean space dot product) can also be trained by much faster methods such as Stochastic Gradient Descent and Pegasos. It may be inadvisable, however, for primal space methods to be directly applied to other kernels, since primal space methods may by definition depend on the expanded transformed feature values that the kernel trick avoids computing, which may make both primal and dual space SVMs unusable for linearly inseparable problems over large data sets. Approximation methods for SVMs may overcome this problem by sacrificing a small amount of accuracy (which may be quantifiable) in order to reduce computational complexity.

Metric Embeddings & The Nyström Method

Metric embedding includes methods that, given a kernel function K(x, y) and possibly some data items, provide a mapping of the data back into a low(er) dimensional space, such that standard Euclidean dot product(s) between the transformed data items approximates the kernel function K. One such technique is the Nyström method, which may rely on taking a manageably sized reference sample of data and evaluating the kernel between all pairs of this sample. For any new data items, the kernel may be computed between the new item and every item in the reference sample. The kernel function between any pair of new items is then estimated from the computed kernel functions between the new items and the reference sample & among the reference samples themselves. This is made possible by the fact that kernel functions should by definition obey the geometric properties of a dot product.

Given a kernel K that corresponds to a transformation T and a training set feature matrix A (which may be data structure 500 in some embodiments, or another data structure in other embodiments), the Nyström method first selects from the data items a manageably sized reference sample with the feature matrix R (a submatrix of A), and computes the kernel matrix $\kappa$ with $\kappa_{ij}=K(R_i,R_j)$ of all pairwise kernel products between the reference samples. The singular value decomposition $U\Sigma V$ of K is then used to construct a normalizing matrix $N=U\Sigma^{-1}V$, with the property that $NN^T \approx \kappa^{-1}$ (with N being retained to normalize any future data that may be transformed). Any new data with a feature matrix b can then be transformed by first computing the matrix B with $B_{ij}=K(b_i, R_j)$ of all kernel products of the new data items with the reference sample. This result is then transformed by the normalizing matrix N to give $\beta=BN$ with the property that $\beta\beta^T \approx \kappa$, where $\kappa_{ij}=K(b_i, b_j)$ is the matrix of kernel products among all the data items in b.

The output of the Nyström method may be used to train a primal space SVM to leverage the benefits of kernels and allow training SVMs on larger data sets. However, for big data there may be little or no advantage in some cases to using an SVM after the Nyström method. One advantage of SVMs, for example, is preventing overfitting. For large data sets, the number of features extracted from the Nyström method can be many times smaller than the number of training items. At this point there is little risk of overfitting and the use of margins may be unlikely to be of much help and might potentially harm learning. The Nyström method may act as a dimension reduction from the implicit expanded feature space of the kernel, and may therefore be a form of regularization itself. Accordingly, it may be helpful to explore classifiers that are optimized for aspects other than overfitting prevention—for example, the Fisher classifier, as discussed below.

Fisher Linear Discriminant

The Fisher linear discriminant is a method that is designed to optimally separate data with classes coming from multidimensional Gaussian distributions. It tries to find a one-dimensional projection of the data such that the distance between the means of the distributions is maximized relative to their variances. Formally, the algorithm may optimize the objective function:

$$J(\omega) = \frac{|m_1 - m_2|^2}{s_1^2 + s_2^2}$$

where m represents a mean, $s^2$ represents a variance, and the subscripts denote the two classes.

Nyström/Fisher Classifier

The present inventors recognized that applying Fisher linear discriminant analysis techniques to an output of the Nyström method may yield beneficial results, particularly as applied to text samples. The phrase "Nyström/Fisher classifier" is thus used herein to describe a (new) non-linear classifier that performs the Nyström method on a set of data, and then applies Fisher linear discriminant analysis techniques to the result of the Nyström method. Thus, for example, the Fisher linear discriminant algorithm may be applied to the $\beta$ matrices output from the Nyström method in various embodiments in order to provide a classifier (e.g., a set of criteria) that is usable to classify an unknown text sample into one of a plurality of categories.

Figure 7A:
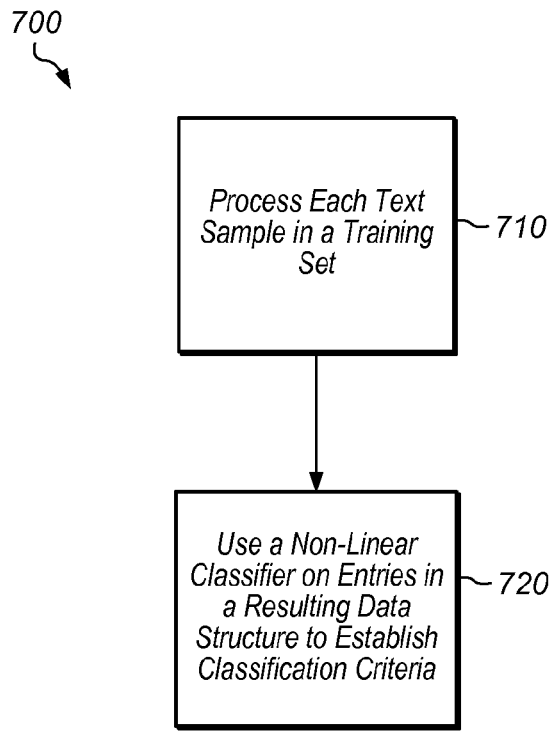

Turning now to FIG. 7A, a flow chart is shown of one embodiment of a method 700 relating to using a non-linear classifier usable to establish classification criteria for text samples. All or a portion of method 700 may be executed by a computer system such as system 900 (described below relative to FIG. 9). Additionally, method 712 of FIG. 7B may be used as part of step 710 in various embodiments.

In step 710 of the embodiment of FIG. 7A, each text sample in a training set is processed. The training set that is used in step 710 may be a training set of previously classified (e.g., human reviewed) text samples, each of which may correspond to one of a plurality of classifications. In some embodiments, the training set used in step 710 is a balanced training set containing on the order of 10,000 to 100,000 text samples, but in other embodiments, the training set used may be larger or smaller.

Figure 7B:
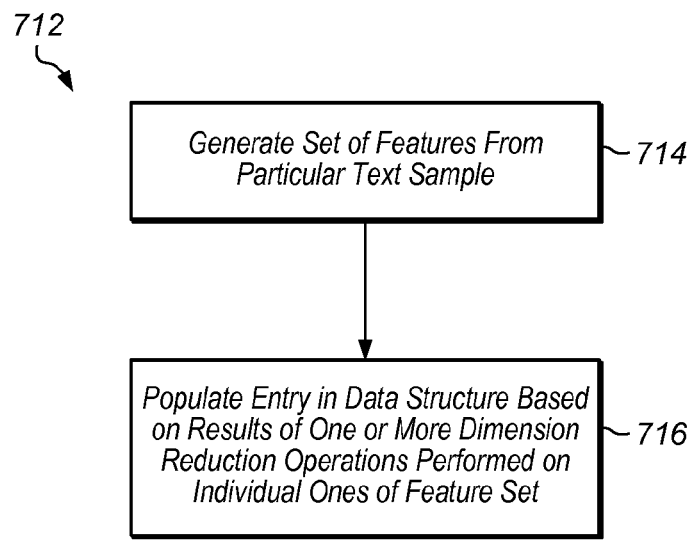
FIG. 7B is a flow chart of one embodiment of a method usable with the method of FIG. 7A.

In the embodiment of FIG. 7A, each text sample in the set of training samples is processed according to method 712 of FIG. 7B. Thus, turning to FIG. 7B, in step 714, a particular text sample that is being processed is processed to generate a set of corresponding features. In various embodiments, the generated set of features for a text sample comprises a plurality of n-grams, each having N characters (where N is an integer equal to or greater than 1). In one embodiment, the generated set of features for a text sample comprises n-grams that are all the same length, while in other embodiments the generated set of features for a text sample comprises n-grams of different lengths (e.g., 1-grams, 2-grams, 3-grams, and 4-grams, etc.).

Each one of a plurality of text samples being processed in step 710 of FIG. 7A may also utilize step 716 of FIG. 7B in various embodiments. In step 716, a data structure entry is populated based on results of one or more dimension reduction operations performed on ones of the respective set of features for a particular text sample. In some embodiments, step 716 includes populating one or more containers of a row of data structure 500 (e.g., such as data structure 450) based on one or more values generated from one or more hash functions, and in one embodiment, step 716 includes performing a modulo operation on a hash value resulting from a hash function in order to select a particular one of a plurality of containers (e.g., columns in a particular row). Thus, as just one example, step 716 might include modifying a value for an entry (container) of data structure 500 that is in row 1, column 4, with one or more particular values. Such a populating action may be based on a dimension reduction operation such as hashing, or another dimension reduction operation type as discussed herein (or that would occur to one with skill in the art).

Returning to the embodiment of FIG. 7A, subsequent to step 710, in which each text sample in a training set is processed (e.g., according to steps 714 and 716), step 720 shows a non-linear classifier being used on entries in a populated data structure to establish criteria usable to classify an unknown text sample into one of a plurality of classifications. In one embodiment, a random forest classifier is a non-linear classifier that is used by step 720. For example, in accordance with the description accompanying FIG. 6 above, criteria established by a plurality of trees (e.g., at least 100 trees in one embodiment) may be used to classify an unknown sample. In another embodiment, a Nyström/Fisher classifier is a non-linear classifier used by step 720.

In various embodiments, dimension reduction operations used for method 700 may reduce a possible feature value space by differing amounts. For example, in one embodiment where text samples have 4-grams for features and each character may have 100 possible values, there are $100^4$ potential values for the 4-grams, i.e., there are 100,000,000 possible values. Dimension reduction may reduce this by one or more orders of magnitude in some cases (e.g., from $C^N$ to not greater than $C^{N-1}$ in some embodiments, where C is the number of possible characters and N is a length of a portion of a text sample (feature)). Dimension reduction is not thus limited, and in some embodiments may be of lesser or greater magnitude (e.g., it may be significantly greater, reducing a feature space from size $100^4$ ($10^8$) to an order of magnitude of $10^3$, for example.

In another embodiment, however, for at least some features corresponding to the text samples in the training set, a dimension reduction operation is not performed in order to populate the data structure. For example, when using 1-grams and 2-grams, in some embodiments, it may not be necessary to perform a dimension reduction operation (as those feature spaces may be comparatively small). Accordingly, in one embodiment in which 1-grams and 4-grams are both used as features, dimension reduction operations (e.g., hashing) might not be performed on the 1-grams.

Figure 7C:
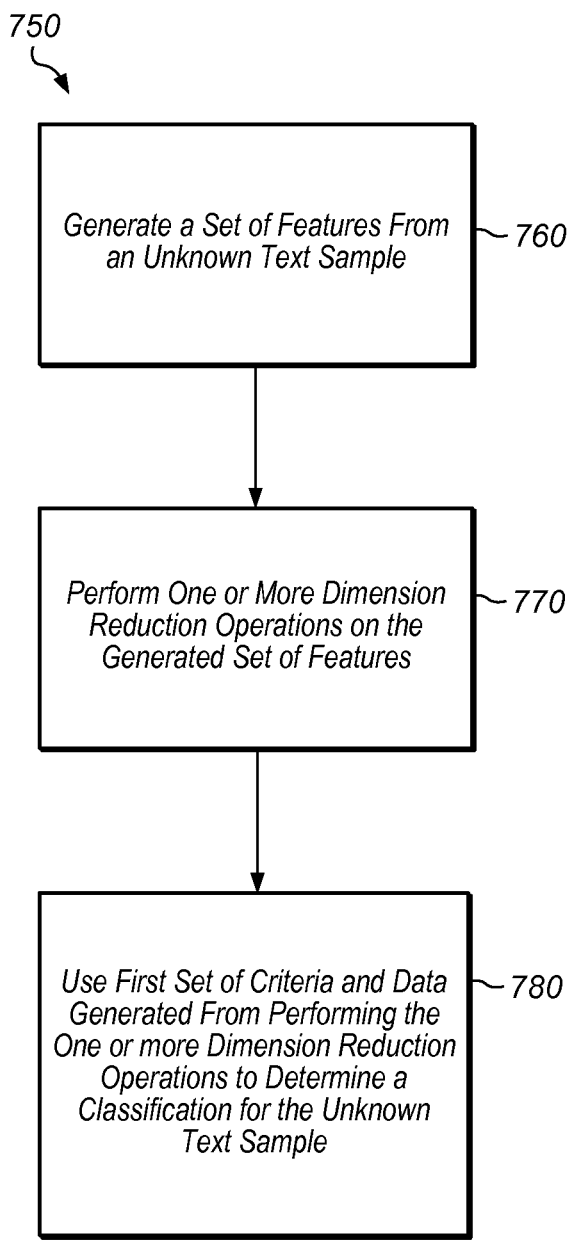
FIG. 7C is a flow chart of one embodiment of a method that relates to classifying an unknown text sample (for example, a text sample that has not been classified by a human reviewer).

Turning now to FIG. 7C, a flow chart is shown of one embodiment of a method 750 that relates to classifying an unknown text sample. Similar to method 700, all or a portion of method 750 may be executed by a computer system such as system 900. Furthermore, in various embodiments, one or more steps, aspects, or features of method 700 may be combined or used with one or more steps, aspects, or features of method 750, and vice versa (Likewise, one or more steps, aspects, or features of methods 700 and/or 750 may also be combined or used with one or more steps, aspects, or features of computer-readable medium 800, described below, and vice versa).

In step 760, a set of features is generated from an unknown text sample. Step 760 may involve, in various embodiments, the exact same steps as feature generation in step 714. Accordingly, in one embodiment, step 760 includes generating one or more n-grams for an unknown text sample.

In step 770, one or more dimension reduction operations are performed on the generated set of features from step 760. In various embodiments, step 770 may include dimension reduction operations as discussed relative to step 716. Accordingly, in one embodiment, step 770 includes performing one or more hashes on one or more numeric values for an n-gram (e.g., as discussed relative to FIG. 4), and producing resulting values.

In step 780, a first set of criteria and data generated from performing the one or more dimension reduction operations of step 770 are used to determine a classification for an unknown text sample. Data generated from step 770 may include data from a data structure such as 450 (e.g., a vector containing feature values that correspond to one or more different n-grams or other text features).

In various embodiments of step 780, the first set of criteria has been established using a training procedure that is similar or identical to the steps outlined relative to method 700, discussed above. Thus, in one embodiment, step 780 includes (1) performing one or more dimension reduction operations on features within text samples in a training set that includes text samples for each of a plurality of categories; (2) populating a data structure having entries corresponding to text samples in the training set, wherein the populating is based on the one or more dimension reduction operations; and (3) using a non-linear classifier on the data structure to establish the first set of criteria.

In one embodiment, the unknown text sample for which method 750 is performed is an item of user-generated content (UGC). In such an embodiment, method 750 may also include determining whether to approve the (unknown) UGC item for presentation on, or dissemination to one or more websites based on the classifying (e.g., based on a category into which the UGC item is classified). Accordingly, in various embodiments, method 750 may include automatically approving UGC for dissemination, automatically disapproving UGC for dissemination, flagging UGC for a follow-up review by a human, or placing the UGC into another category (e.g., approved, but with a code, etc.).

In other embodiments, a second set of criteria is also used to classify an unknown text sample. Such a second set of criteria may have been established using different features, different dimension reduction operations, a different data structure, and/or a different non-linear classifier. For example, in one embodiment, the features used for the different training procedure are 1-grams, 2-grams, 3-grams, and 4-grams. Thus, in one particular embodiment, a first set of classification criteria are established using one type of n-gram (e.g., 4-grams) and a random forest classifier, while a second set of classification criteria are established using a plurality of types of n-grams (or other features) and a Nyström/Fisher classifier.

In some embodiments in which two sets of classification criteria are used to determine a classification for an unknown text sample, the text sample may be automatically categorized (e.g., without human review) if both of the classification criteria agree on a same classification. That is, if two differently established classification criteria agree on a same classification for an unknown text sample, there may be a higher probability that such a classification is correct (e.g., not a false positive or false negative). If two different established classification criteria disagree, however, an unknown text sample may be automatically flagged for further review (e.g., by a human) in some embodiments.

Note also that in some embodiments, feature generation may be language agnostic (i.e., language independent). That is, if n-grams are used as features for text samples, the n-grams are based on characters within a text sample, not words themselves. Accordingly, it may be possible to use n-grams in some embodiments to correctly classify unknown text samples from two different languages. Using n-grams for features may also make automatic category classification more fault-tolerant of spelling mistakes, grammar or punctuation errors, idiom usage, etc.

Figure 8:
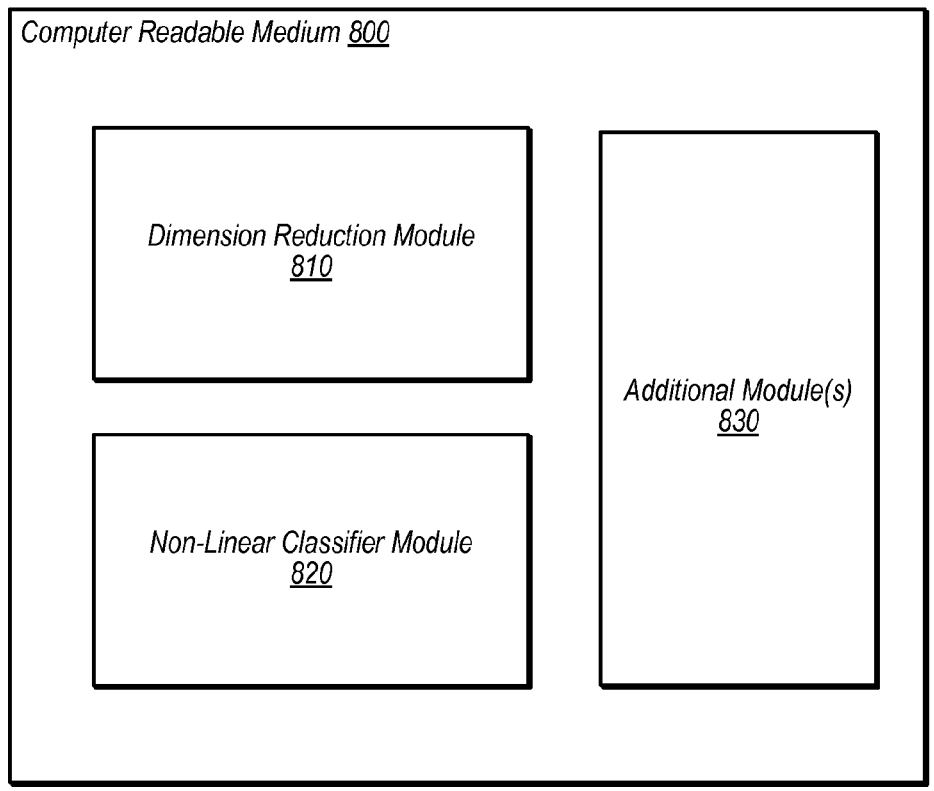
FIG. 8 is a diagram of one embodiment of a computer-readable storage medium.

Turning now to FIG. 8, one embodiment of a computer-readable storage medium 800 is shown. In various embodiments, any or all of the modules (or a portion thereof) in medium 800 can be present in any computer system or computing device described herein (e.g., such as content moderation system 1030). As shown, computer readable storage medium 800 includes a dimension reduction module 810 and a non-linear classifier module 820. In some embodiments, one or more additional modules 830 may also be present, which may be executed to cause additional steps or features to be performed. In general, any steps, details, characteristics, or features described relative to methods 700, 750 and/or computer readable medium 800 may be suitably combined various embodiments.

In one embodiment, dimension reduction module 810 is configured to perform one or more dimension reduction operations on features generated from each text sample within a training set for a plurality of different classifications. Features generated from each text sample may include one or more n-grams, in various embodiments. In module 810, the dimension reduction operations for a given text sample may be used to populate a corresponding entry for that text sample in a data structure (e.g., such as populating entries in data structure 500, or another data structure).

In one embodiment, non-linear classifier module 820 is configured to operate on (populated) entries of a data structure to establish criteria usable to classify an unknown text sample into one or more of a plurality of different classifications. Accordingly, module 820 may be configured to create a plurality of trees as part of a random forest classifier. Module 820 may also be configured to create a Nyström/Fisher classifier that is usable to classify unknown text samples. In some embodiments, neural networks may be used in order to classify an unknown text sample into a plurality of different classifications (e.g., assigning both categories 0 and categories 6 to a text sample). For example, in some embodiments, a training set may include human-reviewed content items that have been assigned multiple categories; in such embodiments, neural network classifiers may be configured to learn how to classify text into two or more categories.

In some embodiments, dimension reduction operations (e.g., performed by module 810) for a given feature in a given text sample may include selecting one of a number of containers within a corresponding entry in a data structure. In such embodiments, the number of containers may be less than a number of possible values for the given feature. In another embodiment, the training set used may be comprised of UGC items that have been respectively classified by one or more human reviewers into one or more of a plurality of different classifications.

In other embodiments, one or more dimension reduction operations may include one or more hashing operations that produce a hash value, and a modulo operation on the hash value. In one embodiment, the data structure that is populated is a matrix having a width corresponding to a base value used for such a modulo operation. In yet another embodiment, the modulo operation is performed using a base value of 4096 or less (though other base values are contemplated for some embodiments).

Figure 10:
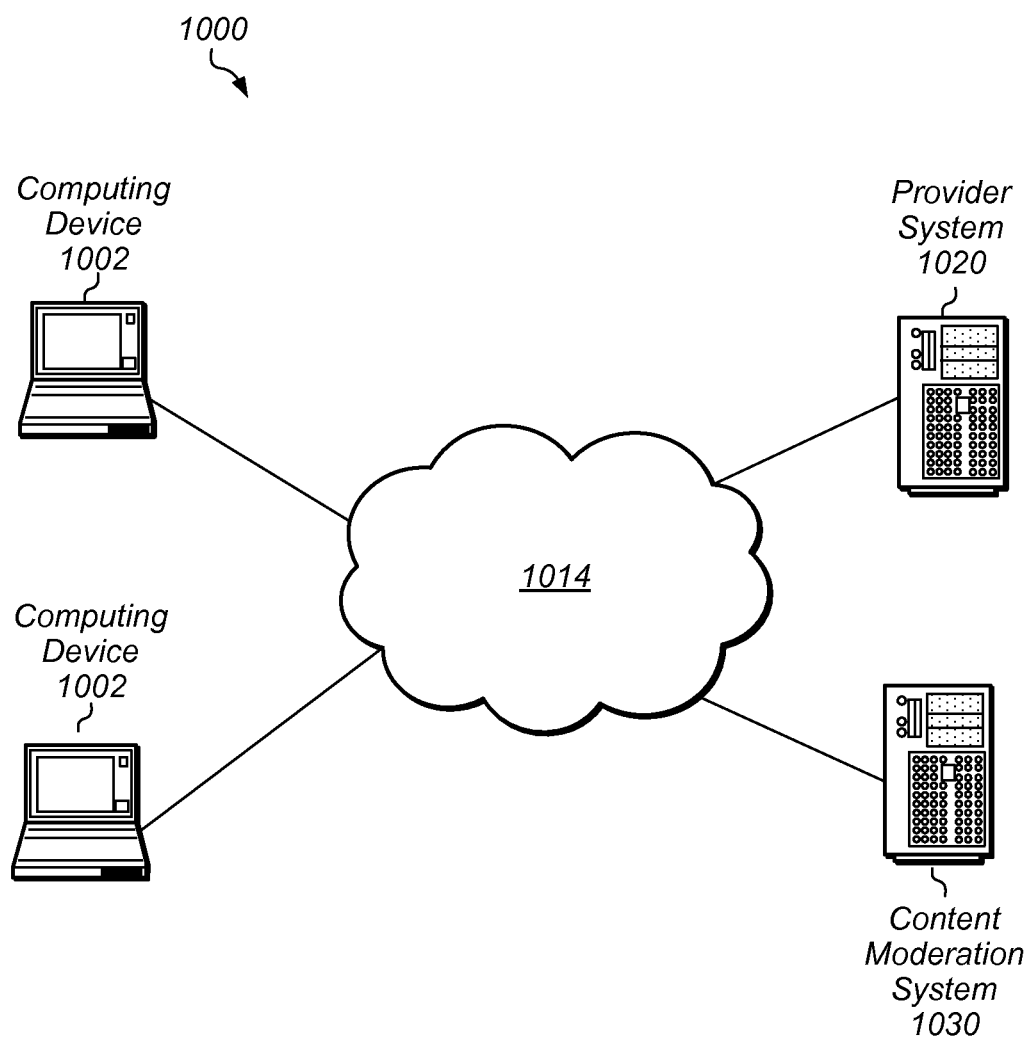
FIG. 10 is a diagram of one embodiment of a system that includes two or more computer systems that may be in communication with one another via a network.

Turning ahead to FIG. 10, a diagram 1000 depicting one embodiment of a system in which techniques and structures relating to text sample classification may be used. In this figure, one or more user computing devices 1002 may be in communication with one or more of systems 1020 and 1030 via a network 1014. Network 1014 may be the Internet in some embodiments, and may include one or more other networks (not depicted), wired or wireless communication links, etc.

In various embodiments, user computing device 1002 maybe used to submit UGC to and/or receive UGC from a website hosted by provider system 1020. Provider system 1020 may be any computer system, in various embodiments, that is associated with a provider of goods and/or services (note that as used herein, the term "provider" includes its ordinary meaning and may refer, in various embodiments, to a manufacturer, offeror of services, restaurant, reseller, retailer, wholesaler, and/or distributor). Thus, in some embodiments, provider system 1020 is owned or operated by a provider, while in other embodiments, is owned or operated by another party (e.g., a third party having a relationship with the provider). Provider system 1020 may include a server that is configured, in various embodiments, to facilitate purchases of goods or services, to provide information (which may include UGC) about goods or services, and/or to solicit UGC relating to an opinion of one or more goods or services.

Content moderation system 1030 may, in various embodiments, be configured to receive UGC, store UGC, provide UGC, classify UGC, create training models and/or classification criteria, and/or perform other actions. Accordingly, in some embodiments, content moderation system 1030 is configured to perform one or more aspects of methods 700 and 750, and/or execute one or more aspects of computer-readable medium 800. (In other embodiments, another computer system may perform and/or execute accordingly.)

In various embodiments, content moderation system 1030 is configured to receive UGC and/or other information (e.g., transactional details, etc.) from provider system 1020, and may be controlled by (or associated with) an entity other than an entity that owns or operates provider system 1020. Content system 1030 may also receive UGC and/or other data from other systems not depicted (e.g., a system corresponding to an external site such as YELP.COM, GOOGLE.COM, etc.) in some embodiments.

Thus, in various embodiments, content moderation system 1030 may store UGC and later provides that UGC to provider system 1020 (or may provide the UGC directly to a user computing device 102) so that a user of a website can view the provided UGC as part of a browsing experience. UGC that has been provided to a user in this manner may help facilitate a purchase, provide information, and/or perform other functions.

In various embodiments, UGC that is provided to a user may first have to be classified as being in an "approved" category. For example, a provider may wish to exclude UGC from being presented if it is irrelevant, overly negative, favorably discusses a competitor's product or service and/or provides a link to a website at which a competitor's product or service may be purchased, etc. Thus, content moderation system 1030 may use classification criteria to automatically classify submitted UGC in various embodiments. Performing such classification without human review may represent a significant savings, particularly when quantities of UGC are large.

Furthermore, in various embodiments, techniques and structures used herein may be used to improve error rates and/or to increase a percentage of UGC that can successfully be classified automatically. In some embodiments, for example, if UGC (or other content) cannot be classified within a margin of certainty, that content may be flagged for human review (which may be expensive). If successful classification rates are improved (even marginally), a significant savings may be had, particularly when dealing with large amounts of UGC. For example, if a website receives 10,000,000 items of UGC a year and a classification rate is increased from 96% to 98%, there may be 200,000 additional items of UGC (or other content) that do not need human review.

Exemplary Computer System

Figure 9:
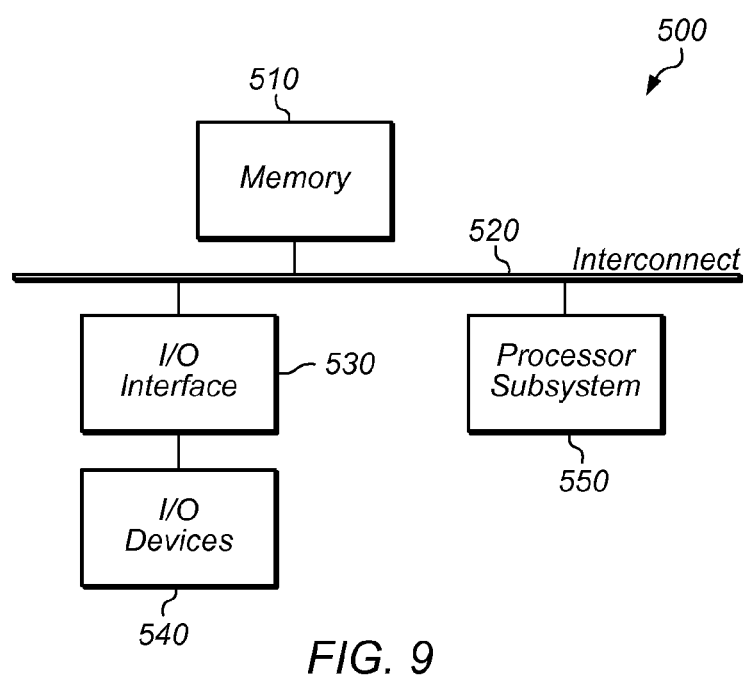
FIG. 9 is a diagram of one embodiment of an exemplary computer system.

Turning now to FIG. 9, one embodiment of an exemplary computer system 900 is depicted. Computer system 900 includes a processor subsystem 950 that is coupled to a system memory 910 and I/O interfaces(s) 930 via an interconnect 920 (e.g., a system bus). I/O interface(s) 930 are coupled to one or more I/O devices 940. Computer system 900 may be any of various types of devices, including, but not limited to, a server system, personal computer system, desktop computer, laptop or notebook computer, mainframe computer system, handheld computer, workstation, network computer, or a device such as a mobile phone, pager, or personal data assistant (PDA). Computer system 900 may also be any type of networked peripheral device such as storage devices, switches, modems, routers, etc. Although a single computer system 900 is shown for convenience, the system may also be implemented as two or more computer systems operating together.

Processor subsystem 950 may include one or more processors or processing units. In various embodiments of computer system 900, multiple instances of the processor subsystem may be coupled to interconnect 920. In various embodiments, processor subsystem 950 (or each processor unit within the subsystem) may contain a cache or other form of on-board memory. In one embodiment, processor subsystem 950 may include one or more processors.

System memory 910 is usable by processor subsystem 950. System memory 910 may be implemented using different physical memory media, such as hard disk storage, floppy disk storage, removable disk storage, flash memory, random access memory (RAM-SRAM, EDO RAM, SDRAM, DDR SDRAM, RDRAM, etc.), read only memory (PROM, EEPROM, etc.), and so on. Memory in computer system 900 is not limited to primary storage. Rather, computer system 900 may also include other forms of storage such as cache memory in processor subsystem 950 and secondary storage on the I/O Devices 940 (e.g., a hard drive, storage array, etc.). In some embodiments, these other forms of storage may also store program instructions executable by processor subsystem 950.

I/O interfaces 930 may be any of various types of interfaces configured to couple to and communicate with other devices, according to various embodiments. In one embodiment, I/O interface 930 is a bridge chip (e.g., Southbridge) from a front-side to one or more back-side buses. I/O interfaces 930 may be coupled to one or more I/O devices 940 via one or more corresponding buses or other interfaces. Examples of I/O devices 940 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device. The network interface device may be a wireless interface in various embodiments. In other embodiments, computer system 900 is part of a cloud-based computing service. In general, the present disclosure is not limited to any particular type of computer architecture.

Computer-Readable Medium

The above-described techniques and methods may be implemented as computer-readable instructions stored on any suitable computer-readable storage medium (such as medium 400). As used herein, the term computer-readable storage medium refers to a (nontransitory, tangible) medium that is readable by a computing device or computer system, and includes magnetic, optical, and solid-state storage media such as hard drives, optical disks, DVDs, volatile or nonvolatile RAM devices, holographic storage, programmable memory, etc. The term "non-transitory" as applied to computer-readable media herein is only intended to exclude from claim scope any subject matter that is deemed to be ineligible under 35 U.S.C. §101, such as transitory (intangible) media (e.g., carrier waves per se), and is not intended to exclude any subject matter otherwise considered to be statutory. Computer-readable storage mediums can be used, in various embodiments, to store executable instructions and/or data. In some embodiments, particular functionality may be implemented by one or more software "modules". A software module may include one or more executable files, web applications, and/or other files, and in some embodiments, and may make use of PHP, JAVASCIPT, HTML, Objective-C, JAVA, MATLAB, or any other suitable technology. In various embodiments, software functionality may be split across one or more modules and/or may be implemented using parallel computing techniques, while in other embodiments various software functionality may be combined in single modules. Software functionality may be implemented and/or stored on two or more computer systems (e.g., a server farm, or a front-end server and a back-end server and/or other computing systems and/or devices) in various embodiments.

Listing Of Selected Embodiments

The following embodiment listings are provided in accordance with structures and techniques described herein:

Embodiment 1. A method, comprising:
  a computer system processing each text sample in a training set, wherein each text sample in the training set corresponds to one of a plurality of classifications, and wherein processing each text sample includes:
    generating a respective set of features from that text sample;

populating an entry in a data structure based on results of one or more dimension reduction operations performed on ones of the respective set of features for that text sample;
the computer system using a non-linear classifier on entries in the data structure to establish criteria usable to classify an unknown text sample into one of the plurality of classifications.

Embodiment 2. The method of embodiment 1, wherein each of a plurality of features in the respective set of features for a given text sample in the training set is an n-gram having N characters.

Embodiment 3. The method of embodiment 1, wherein features in a respective set of features for a given text sample in the training set include n-grams of different lengths.

Embodiment 4. The method of embodiment 1, wherein populating an entry in the data structure for a given text sample comprises:
hashing one of the respective set of features for the given text sample to produce a hash value;
performing a modulo operation on the hash value to select one of a plurality of containers in the entry; and
modifying a value of the selected container.

Embodiment 5. The method of embodiment 1, wherein the non-linear classifier is a random forest classifier.

Embodiment 6. The method of embodiment 5, wherein the random forest classifier uses at least 100 trees.

Embodiment 7. The method of embodiment 1, wherein the non-linear classifier is a Nyström/Fisher classifier.

Embodiment 8. The method of embodiment 1, wherein for at least some of the text samples in the training set, a dimension reduction operation is not performed on one or more features of those text samples in order to populate the data structure.

Embodiment 9. The method of embodiment 1,
wherein each text sample in the training set is made up of characters within a text character set having C possible characters, wherein each feature in the respective set of features for a given text sample in the training set has N characters, and wherein populating an entry in the data structure for the given text sample includes a dimension reduction operation on individual ones of the respective set of features such that a corresponding value for each of those features is reduced from $C^N$ possible values to not greater than $C^{N-1}$ possible values;
wherein N is an integer greater than or equal to 3 and C is an integer greater than or equal to 20.

Embodiment 10. The method of embodiment 1, wherein populating an entry in the data structure for a given text sample comprises:
hashing one of the respective set of features for the given text sample by performing a plurality of hashing operations; and
modifying a value of a selected one of the plurality of containers based on the hashing.

Embodiment 11. A non-transitory computer-readable medium storing program instructions executable by a computing system to perform operations comprising:
for each text sample within a training set for a plurality of different classifications, performing one or more dimension reduction operations on features generated from the text sample to populate a corresponding entry for that text sample in a data structure; and
using a non-linear classifier to operate on entries in the data structure to establish criteria usable to classify an unknown text sample into one or more of the plurality of different classifications.

Embodiment 12. The non-transitory computer-readable medium of embodiment 11, wherein performing dimension reduction operations on a given feature in a given text sample in the training set includes selecting one of a number of containers within the corresponding entry in the data structure, wherein the number of containers is less than a number of possible values of the given feature.

Embodiment 13. The non-transitory computer-readable medium of embodiment 11, wherein the training set comprises a plurality of user-generated content (UGC) items that have each been respectively classified by one or more human reviewers into one or more of the plurality of different classifications.

Embodiment 14. The non-transitory computer-readable medium of embodiment 12, wherein the one or more dimension reduction operations comprise:
one or more hashing operations to produce a hash value; and
a modulo operation on the hash value;
wherein the data structure is a matrix having a width corresponding to a base value used for the modulo operation.

Embodiment 15. The non-transitory computer-readable medium of embodiment 14, wherein the base value used for the modulo operation is equal to or less than 4096.

Embodiment 16. A method, comprising:
a computer system classifying an unknown text sample into one of a plurality of categories, wherein the classifying comprises:
generating a set of features from the unknown text sample;
performing one or more dimension reduction operations on the generated set of features; and
using a first set of criteria and data generated from the performing the one or more dimension reduction operations to determine a classification for the unknown text sample, wherein the first set of criteria was established by a training procedure that includes:
performing one or more dimension reduction operations on features within text samples in a training set that includes text samples for each of the plurality of categories;
populating a data structure having entries corresponding to text samples in the training set, wherein the populating is based on the one or more dimension reduction operations;
using a non-linear classifier on the data structure to establish the first set of criteria.

Embodiment 17. The method of embodiment 16, wherein the unknown text sample is a user-generated content (UGC) item, wherein the method further comprises determining whether to approve the UGC item for dissemination to one or more websites based on the classifying.

Embodiment 18. The method of embodiment 16, wherein the classifying also uses a second set of criteria established by a different training procedure that operates on the text samples in the training set using different features, different dimension reduction operations, a different data structure, and a different non-linear classifier.

Embodiment 19. The method of embodiment 18, wherein the non-linear classifier is a random forest classifier, and the different non-linear classifier is a Nyström/Fisher classifier.

Embodiment 20. The method of embodiment 19, wherein the features utilized to established the first set of criteria are only four-grams, and wherein the features used to establish the second set of criteria are one-grams, two-grams, three-grams, and four-grams.

Although specific embodiments have been described herein, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Additionally, section or heading titles provided above in the detailed description should not be construed as limiting the disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    a computer system processing each text sample in a training set, wherein each text sample in the training set corresponds to one of a plurality of classifications, and wherein processing each text sample includes:
        generating a respective set of features from that text sample;
        populating an entry in a data structure based on results of one or more dimension reduction operations performed on ones of the respective set of features for that text sample;
    the computer system using a non-linear classifier on entries in the data structure to establish criteria usable to classify an unknown text sample into one of the plurality of classifications;
    wherein each text sample in the training set is made up of characters within a text character set having C characters, wherein each feature in the respective set of features for a given text sample in the training set has N characters, and wherein populating an entry in the data structure for the given text sample includes a dimension reduction operation on individual ones of the respective set of features such that a corresponding value for each of those features is reduced from $C^N$ possible values to not greater than $C^{N-1}$ possible values;
    wherein N is an integer greater than or equal to 3 and C is an integer greater than or equal to 20.

2. The method of claim 1, wherein each of a plurality of features in the respective set of features for a given text sample in the training set is an n-gram having N characters.

3. The method of claim 1, wherein features in a respective set of features for a given text sample in the training set include n-grams of different lengths.

4. The method of claim 1, wherein populating an entry in the data structure for a given text sample comprises:
    hashing one of the respective set of features for the given text sample to produce a hash value;
    performing a modulo operation on the hash value to select one of a plurality of containers in the entry; and
    modifying a value of the selected container.

5. The method of claim 1, wherein the non-linear classifier is a random forest classifier.

6. The method of claim 5, wherein the random forest classifier uses at least 100 trees.

7. The method of claim 1, wherein the non-linear classifier is a Nyström/Fisher classifier.

8. The method of claim 1, wherein for at least some of the text samples in the training set, a dimension reduction operation is not performed on one or more features of those text samples in order to populate the data structure.

9. The method of claim 1, wherein populating an entry in the data structure for a given text sample comprises:
    hashing one of the respective set of features for the given text sample by performing a plurality of hashing operations; and
    modifying a value of a selected one of a plurality of containers in the entry based on the hashing.

10. A non-transitory computer-readable medium having stored thereon program instructions executable by a computing system to perform operations comprising:
    for each text sample within a training set for a plurality of different classifications, performing one or more dimension reduction operations on features generated from that text sample to populate a corresponding entry for that text sample in a data structure, wherein one or more text samples within the training set contain a plurality of words in one or more particular human languages, wherein each text sample in the training set is made up of characters within a text character set having C characters, wherein features corresponding to text samples in the training set have N characters, and wherein populating an entry in the data structure for a given text sample includes a dimension reduction operation such that a corresponding feature value is reduced from $C^N$ possible values to not greater than $C^{N-1}$ possible values, where N is an integer greater than or equal to 3 and C is an integer greater than or equal to 20; and
    using a non-linear classifier to operate on entries in the data structure to establish criteria usable to classify an unknown text sample into one or more of the plurality of different classifications, wherein the entries in the data structure include one or more entries corresponding to the one or more text samples that contain the plurality of words in one or more particular human languages.

11. The non-transitory computer-readable medium of claim 10, wherein performing dimension reduction operations on a given feature in a given text sample in the training set includes selecting one of a number of containers within the corresponding entry in the data structure, wherein the number of containers is less than a number of possible values of the given feature.

12. The non-transitory computer-readable medium of claim 10, wherein the training set comprises a plurality of user-generated content (UGC) items that have each been respectively classified by one or more human reviewers into one or more of the plurality of different classifications.

13. The non-transitory computer-readable medium of claim 11, wherein the one or more dimension reduction operations comprise:
    one or more hashing operations to produce a hash value; and
    a modulo operation on the hash value;
    wherein the data structure is a matrix having a width corresponding to a base value used for the modulo operation.

14. The non-transitory computer-readable medium of claim 13, wherein the base value used for the modulo operation is equal to or less than 4096.

15. A method, comprising:
- a computer system receiving an unknown text sample that includes user-generated content (UGC) submitted to a first website in connection with a user comment about a product or service, wherein the unknown text sample includes one or more words in one or more human languages;
- the computer system classifying the unknown text sample into one of a plurality of categories, wherein a first one of the plurality of categories corresponds to content prohibited from being published on a particular website, and wherein a second one of the plurality of categories corresponds to content allowed to be published on the particular website;
- wherein the classifying comprises:
    - generating a set of features from the unknown text sample;
    - performing one or more dimension reduction operations on the generated set of features; and
    - using a first set of criteria and data generated from the performing the one or more dimension reduction operations to determine a classification for the unknown text sample, wherein the first set of criteria was established by a training procedure that includes:
        - performing one or more dimension reduction operations on features within text samples in a training set that includes text samples for each of the plurality of categories;
        - populating a data structure having entries corresponding to text samples in the training set, wherein the populating is based on the one or more dimension reduction operations;
        - using a non-linear classifier on the data structure to establish the first set of criteria;
    - wherein each text sample in the training set is made up of characters within a text character set having C characters, wherein features corresponding to text samples in the training set have N characters, and wherein populating an entry in the data structure for a given text sample includes a dimension reduction operation such that a corresponding feature value is reduced from $C^N$ possible values to not greater than $C^{N-1}$ possible values, where N is an integer greater than or equal to 3 and C is an integer greater than or equal to 20.

16. The method of claim 15, wherein the classifying includes classifying the unknown text sample into the first category based on the unknown text sample including at least one word in a first human language and at least one word in a second human language.

17. The method of claim 15, wherein the classifying also uses a second set of criteria established by a different training procedure that operates on the text samples in the training set using different features, different dimension reduction operations, a different data structure, and a different non-linear classifier.

18. The method of claim 17, wherein the non-linear classifier is a random forest classifier, and the different non-linear classifier is a Nyström/Fisher classifier.

19. The method of claim 18, wherein the features utilized to established the first set of criteria are only four-grams, and wherein the features used to establish the second set of criteria are one-grams, two-grams, three-grams, and four-grams.

\* \* \* \* \*